United States Patent
Rudolf

(10) Patent No.: US 6,539,032 B2
(45) Date of Patent: Mar. 25, 2003

(54) METHODS FOR SYNCHRONIZING BETWEEN A BASE STATION AND A MOBILE STATION IN A CELL-BASED MOBILE COMMUNICATIONS SYSTEM

(75) Inventor: Marian Rudolf, Rennes (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/801,912

(22) Filed: Mar. 9, 2001

(65) Prior Publication Data

US 2001/0021200 A1 Sep. 13, 2001

(30) Foreign Application Priority Data

Mar. 10, 2000 (EP) .............................. 00400682

(51) Int. Cl.[7] .......................... H04Q 7/00; H04B 7/216; H04B 15/00; H04L 7/00
(52) U.S. Cl. .................. 370/503; 370/331; 370/335; 370/342; 375/354; 455/502
(58) Field of Search ................. 370/331, 335, 370/342, 356, 503, 507, 333; 375/145, 208, 206, 354, 355; 455/434, 440, 442, 525

(56) References Cited

U.S. PATENT DOCUMENTS 5,613,205 A * 3/1997 Dufour ....................... 455/440
5,640,677 A * 6/1997 Karlsson ..................... 455/434
5,835,489 A * 11/1998 Moriya et al. .............. 370/342
5,950,131 A * 9/1999 Vilmur ........................ 455/434
6,038,250 A * 3/2000 Shou et al. .................. 375/206
6,151,311 A * 11/2000 Wheatley, III et al. ..... 370/335
6,185,244 B1 * 2/2001 Nystrom et al. ............ 375/145
6,188,682 B1 * 2/2001 Takagi et al. ............... 370/342
6,208,632 B1 * 3/2001 Kowalski et al. ........... 370/335
6,233,454 B1 * 5/2001 Sato ........................... 455/437
6,246,673 B1 * 6/2001 Tiedemann, Jr. et al. ... 370/333
6,327,472 B1 * 12/2001 Westroos et al. ........... 455/450
6,363,060 B1 * 3/2002 Sarkar ........................ 370/342

* cited by examiner

Primary Examiner—Wellington Chin
Assistant Examiner—M. Phan
(74) Attorney, Agent, or Firm—Oblon, Spivak, McClelland, Maier & Neustadt, P.C.

(57) ABSTRACT

A method of isolating target cell signals, the target cell signals originating from a target cell, from active cell signals, the active cell signals originating from an active cell, in a cell search. The method includes receiving a signal, the received signal being either a target cell signal or an active cell signal, generating a local copy of a known active cell signal, and subtracting the local copy of the known active cell signal from the received signal. The subtracting step is executed when a reception time of the received signal corresponds to an expected reception time of the known active cell signal.

3 Claims, 2 Drawing Sheets

METHODS FOR SYNCHRONIZING BETWEEN A BASE STATION AND A MOBILE STATION IN A CELL-BASED MOBILE COMMUNICATIONS SYSTEM

BACKGROUND OF THE INVENTION

Field of the Invention

The invention relates to methods for synchronizing between a base station and a mobile station in a cell-based mobile communications system.

In cell based mobile communications systems, one area of concern is the amount of time and effort required for handover of a mobile station between cells.

In handover, a mobile station's transmission which acts with one cell is switched to another cell (hard handover) or a new cell is added to those servicing the mobile station (soft handover). Generally, the handover is accomplished through a multitude of steps. However, the first step in this multitude is to locate, e.g. to find timing and characteristics of a cell adjacent to a cell or a group of cells currently being used. For this, a procedure commonly known as a cell search is carried out by the mobile station.

A cell search involves the mobile station finding, acquiring, and synchronizing with the tuning and the characteristics and codes of the adjacent or target cell. To facilitate this search, all base stations, each of which services a specific cell, periodically transmit a primary synchronization code or PSC on a primary synchronization channel or P-SCH. All base stations in a communications system transmit the same PSC. Once a mobile station acquires the PSC from a target cell on that target cell's P-SCH, the mobile station uses the PSC to acquire slot synchronization to a cell. It should be noted that slot synchronization is required since, in the time domain, signals are structured into chips, slots, and frames, where one time slot lasts approximately 666 us, a frame lasts for 10 ms or 15 slots and each slot is subdivided into 2560 chips.

Once a mobile station acquires slot synchronization, further steps, such as frame synchronization and scrambling code identification, are carried out. However, these further steps are beyond the scope of this application.

What is of concern is the amount of time and processing power required for mobile stations to acquire a target cell's PSC and P-SCH.

Generally, mobile stations receive signals from possible or candidate target cells while keeping track of already known or active cells. These signals are received, filtered, and correlated with a local copy of the PSC by the mobile station. The mobile station correlates the received complex signal with a local replica of the PSC at all possible time positions over one slot length. The mobile station then sums up, generally non-coherently, a slot profile composed of correlation values for a set number of slots. This is done by summing up the squared amplitude values at specific time positions for every one of the set number of time slots. The mobile station then chooses the largest correlation peak in the slot profile as the time position of the P-SCH of a target cell. It should be noted that the slot profile contains the correlation values for signals which repeat every slot. These signals from the base stations are repeated at approximately the same time position for every slot.

Unfortunately, in most handover situations, the power levels of the signals from active cells and target cells which are received by the mobile station usually have an approximately constant magnitude. Thus, a mobile station may have a slot profile similar to that shown in FIG. 1 where the correlation output of an active cell signal is approximately similar if not greater in magnitude to a correlation output of a target cell's signal. The mobile station which chooses the cell or the cells that correspond to the signals of correlation output in the slot profile that have one of the strongest magnitude can choose the signals of these active cells in its cell search. Since this is not what is desired, the cell search must be restarted, requiring more time and processing power from the mobile station.

However, in the Wide band Code-Division Multiple Access in Frequency Division Duplex standard, mobile stations continuously keep track of the chip, slot, frame timing, and channel profile of its active cells. What is therefore needed is a method and an apparatus which takes advantage of this data to avoid acquiring the P-SCH of active-cells, thereby facilitating target cell acquisition.

SUMMARY OF THE INVENTION

The invention relates to a method of suppressing the active cell signal contributions to a slot profile by subtracting it from the slot profile. Since the mobile station possesses the relevant characteristics of the active cell signal such as its timing and slot characteristics, a local copy of the active cell signal can be generated. This local copy of the active cell signal can thus be subtracted either from an incoming received signal or from slot profile. This minimizes the presence of the active cell signal, thereby isolating the target cell signal for faster target cell acquisition.

In a first embodiment, the invention provides a method of isolating target cell signals originating from a target cell from active cell signals originating from an active cell in a cell search, the method comprising:

a) receiving a signal, the received signal being either a target cell signal or an active cell signal;

b) generating a local copy of a known active cell signal;

c) subtracting the local copy of the known active cell signal from the received signal wherein step c) is executed if a reception time of the received signal corresponds to an expected reception time of the known active cell signal.

In a second embodiment, the invention provides a method of isolating target cell signals originating from a target cell from active cell signals originating from an active cell in a cell search, the method comprising:

a) receiving a plurality of signals, each of the received signals being either a target cell signal or an active cell signal;

b) generating an actual slot profile based on the plurality of received signals;

c) generating a local copy of an expected active cell signal;

d) generating an expected slot profile from the local copy of the expected active cell signal;

e) subtracting the expected slot profile from the actual slot profile.

In a third embodiment, the invention provides a method of isolating target cell signals originating from a target cell from active cell signals originating from an active cell in a cell search, the method comprising:

a) receiving a signal, the received signal being either a target cell signal or an active cell signal;

b) filtering the received signal c) correlating the received signal with a local copy of an expected synchronization code to obtain a correlated signal d) generating a local copy of a known active cell signal with an expected correlation value; and e) subtracting the local copy of the known active cell signal from the correlated signal wherein step e) is executed if a reception time of the received signal corresponds to an expected reception time of the known active cell signal.

BRIEF DESCRIPTION OF THE INVENTION

A better understanding of the invention will be obtained by considering the detailed description below, with reference to the following drawings in which.

Figure 2:
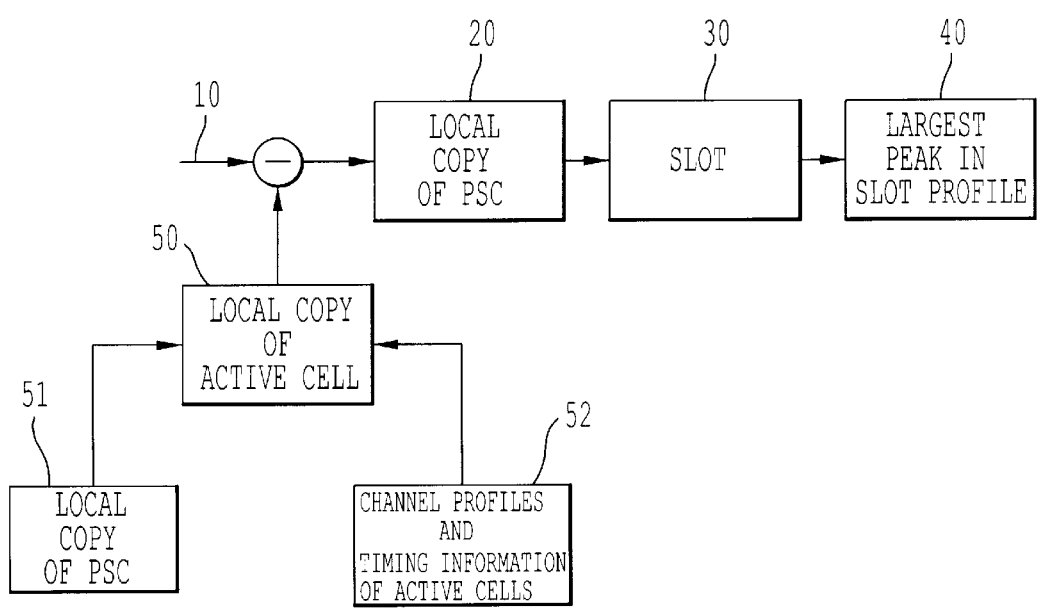
FIG. 2 is a block diagram of a first embodiment of the invention.

Referring to FIG. 2, a block diagram of an embodiment of the invention is illustrated. As noted above, the slot profile is obtained by receiving a received signal (10), filtering and correlating the received signal with a local copy of the PSC (20), and over a predetermined number of slots, determining which signal receptions are periodic and when they occur in the slot (30). Through this, the slot profile is obtained and usually one or more of the largest peak in the slot profile are chosen (40) as the time indication of the target cell signal. As FIG. 2 illustrates, a local copy of the active cell signal is generated (50) and subtracted from the received signal.

Since the mobile station has a local copy (51) of the PSC and the channel profiles and timing information (52) of active cells, a local copy of the expected active cell signal transmitting the PSC can be generated (by 50).

The timing information for the active cell includes when, in every time slot, the active cell is expected. Thus, given that the mobile station possesses the expected content of the active cell signal and when the active cell signal expected reception time in every slot, an expected active cell signal can be generated. Once this expected active cell signal is generated, the reception time of the received signal must be tracked or determined by the mobile station. Depending on the reception time of the received signal as measured from the beginning of a slot, and the time positioning of the expected active cell signal, the generated active cell signal is subtracted from the received signal.

As an example, if the active cell signal is known to be received in the interval between 100 and 150 chips as measured from the beginning of a slot, an expected active cell signal can be generated for that interval. The content of the expected active cell signal along with its expected signal strength is used to duplicate the expected signal.

If a received signal is received between 100 and 150 chips as measured from the beginning of a slot, the generated active cell signal is subtracted from this received signal. If a received signal is received at a time outside the interval when an active cell signal is expected, the generated active cell signal is not generated.

Since the expected active cell signal is subtracted from the received signal even before the received signal is filtered and correlated, any contributions to the slot profile by an active cell is removed from consideration as being a target cell signal.

DETAILED DESCRIPTION OF THE INVENTION

In another embodiment, the expected active cell signal can be subtracted from the received signal at another point in the process. As before, an expected active cell signal can be generated locally by the mobile station. Since the expected active cell can be generated, an expected slot profile can also be generated. Such an expected slot profile can then be subtracted form the actual slot profile. This results in a final slot profile which would only contain contributions from target cells.

Figure 3:
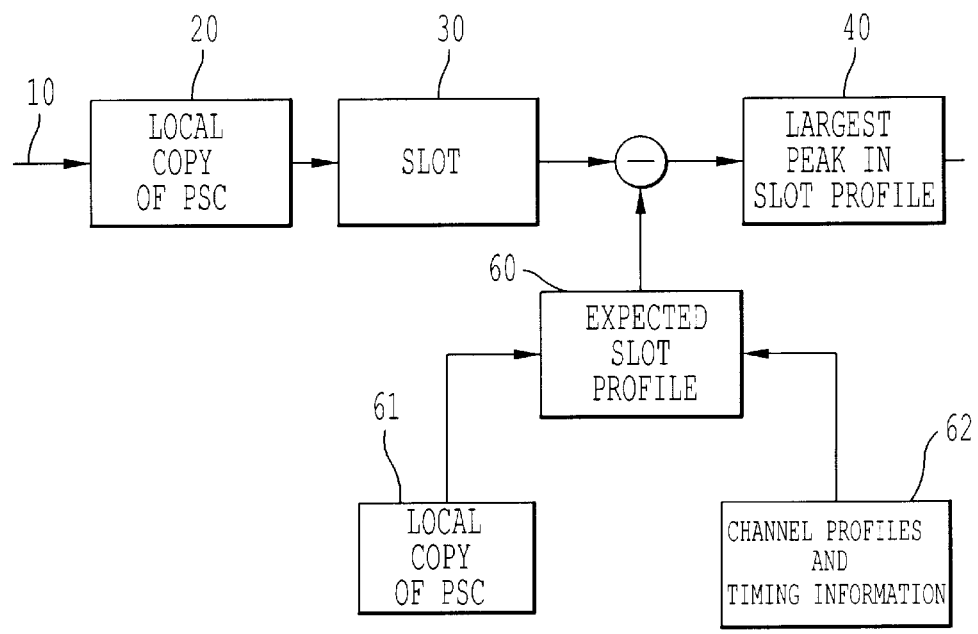
FIG. 3 is a block diagram of a second embodiment of the invention.

FIG. 3 illustrates a block diagram of this process. The received signal (10) is processed as before: it is filtered and correlated with the local copy of the PSC (20), and an actual slot profile is generated showing all signal contributions (30). However, an expected slot profile is also generated (60) which contains only the expected contributions from any active cells. The expected slot profile is generated from a local copy (61) of the PSC and the channel profiles and timing information (62) of the active cells. Since it is a simple matter to generate a local copy of any active cell signal by processing these in much the same way as the received signals are processed, an expected slot profile is generated. For example, since the actual slot profile is generated by non-coherently summing up the squared magnitude values of the correlation output, to generate an expected slot profile would be generated by summing up the squared magnitude values of the expected active cell signals.

After an expected slot profile is generated, this is subtracted from the actual slot profile obtained by processing the received signals. Any contributions from active cells are therefore eliminated, effectively isolating any target cell signals.

A third embodiment of the invention simply moves the point in time when the subtraction is carried out. Using FIG. 3 as a reference, the generation and subtraction of the expected active cell signals are carried out between the summation step (30) and the peak decision step (40). Using FIG. 2, this generation and subtraction is carried out prior to the filtering/correlation step (20) and after the signal reception step (10). A third possible point when this can be executed is between the filter/correlation step (20) and the summation step (30). Thus, the mobile station would generate an expected active cell signal with the expected correlation value. This generated active cell signal would then be subtracted from the filter/correlator output—a correlated signal—if the reception time of the received signal corresponds or is within the range of the expected reception time of an active cell signal. If the received signal is not within the range of the expected reception time of the active cell signal, the generated active cell signal would not be subtracted from the correlated signal.

Figure 1:
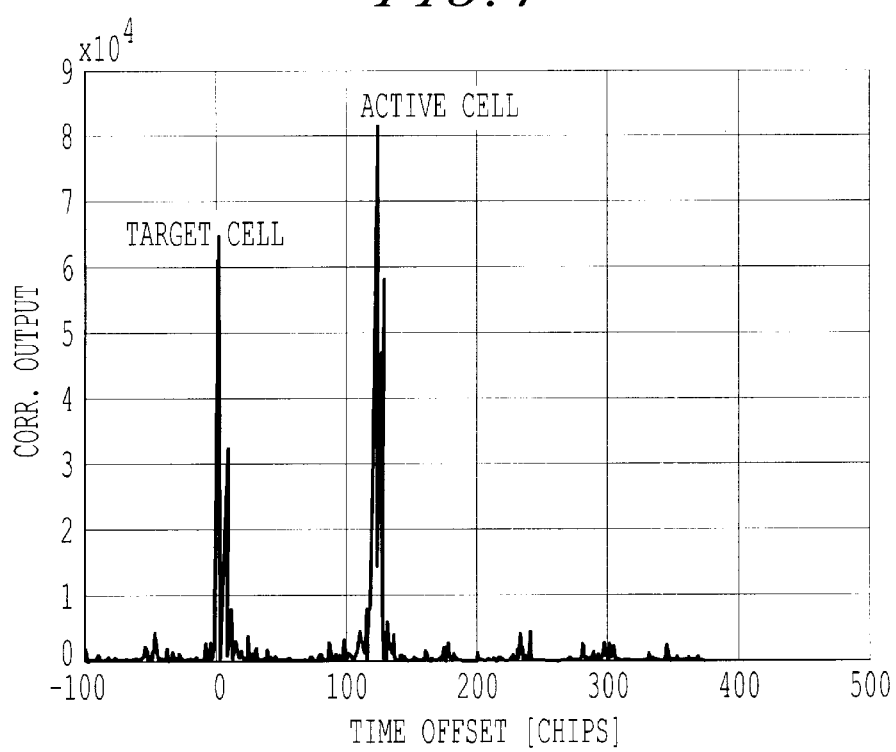
FIG. 1 is an illustration of a slot profile with undesired contributions from an active cell.
Figure 4:
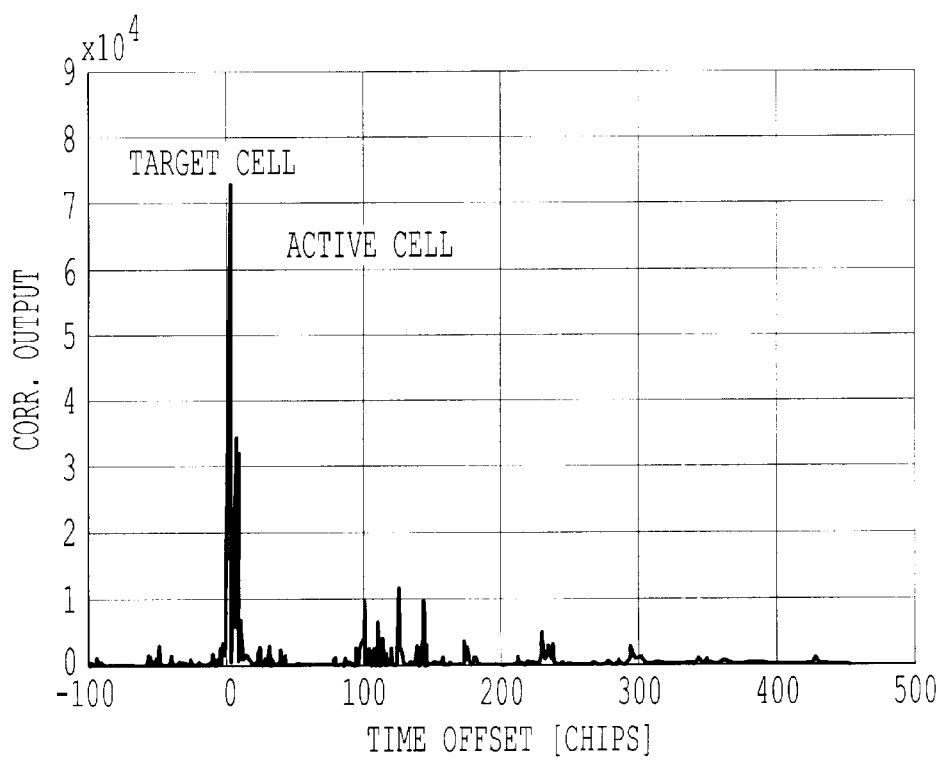
FIG. 4 is an illustration of a slot profile similar to FIG. 1 with the undesired active cell signal contributions suppressed.

As can be seen from a comparison of FIGS. 1 and 4, in FIG. 4 any active cell signals have been minimized leaving only the target cell signal.

It should be noted that the methods disclosed above can easily be extended to multiple active cell signals. Thus, if a mobile station has active cells B, C, and D in its active cell set, multiple local expected active cell signals will be generated. These can be subtracted from the received signal as outlined above, or these can be connected to obtain an expected slot profile.

What is claimed is:

1. A method of isolating target cell signals, said target cell signals originating from a target cell, from active cell signals, said active cell signals originating from an active cell, in a cell search, the method comprising:

receiving a signal, the received signal being either a target cell signal or an active cell signal;

generating a local copy of a known active cell signal; and subtracting the local copy of the known active cell signal from the received signal, wherein said subtracting step is executed when a reception time of the received signal corresponds to an expected reception time of the known active cell signal.

2. A method of isolating target cell signals, said target cell signals originating from a target cell, from active cell signals, said active cell signals originating from an active cell, in a cell search, the method comprising:

receiving a plurality of signals, each of the received signals being either a target cell signal or an active cell signal;

generating an actual slot profile based on the plurality of received signals;

generating a local copy of an expected active cell signal;

generating an expected slot profile from the local copy of the expected active cell signal; and subtracting the expected slot profile from the actual slot profile.

3. A method of isolating target cell signals, said target cell signals originating from a target cell, from active cell signals, said active cell signals originating from an active cell, in a cell search, the method comprising:

receiving a signal, the received signal being either a target cell signal or an active cell signal;

filtering the received signal;

correlating the received signal with a local copy of an expected synchronization code to obtain a correlated signal;

generating a local copy of a known active cell signal with an expected correlation value; and subtracting the local copy of the known active cell signal from the correlated signal, wherein said subtracting step is executed when a reception time of the received signal corresponds to an expected reception time of the known active cell signal.

* * * * *